United States Patent
Oshri et al.

(10) Patent No.: US 8,566,299 B2
(45) Date of Patent: *Oct. 22, 2013

(54) METHOD FOR MANAGING LOCK RESOURCES IN A DISTRIBUTED STORAGE SYSTEM

(75) Inventors: Ofer Oshri, Kfar Saba (IL); Nadav Danieli, Tel Aviv (IL); Menny Hamburger, Nes Tziona (IL)

(73) Assignee: Dell Global B.V.-Singapore Branch, Singapore (SG)

( * ) Notice: Subject to any disclaimer, the term of this patent is extended or adjusted under 35 U.S.C. 154(b) by 25 days.

This patent is subject to a terminal disclaimer.

(21) Appl. No.: 13/312,594

(22) Filed: Dec. 6, 2011

(65) Prior Publication Data

US 2012/0078866 A1    Mar. 29, 2012

Related U.S. Application Data

(63) Continuation of application No. 12/333,868, filed on Dec. 12, 2008, now Pat. No. 8,086,581, which is a continuation of application No. 11/159,216, filed on Jun. 23, 2005, now abandoned.

(60) Provisional application No. 60/581,721, filed on Jun. 23, 2004.

(51) Int. Cl.
*G06F 17/00* (2006.01)
*G06F 12/00* (2006.01)
*G06F 15/16* (2006.01)

(52) U.S. Cl.
CPC .............. *G06F 17/00* (2013.01); *G06F 12/00* (2013.01); *G06F 15/16* (2013.01)
USPC ............ 707/704; 707/703; 710/200; 709/203

(58) Field of Classification Search
CPC ............ G06F 17/00; G06F 17/30; G06F 9/52
USPC .................. 709/203, 206, 225–229; 710/200; 718/103–104; 707/600, 609, 622–626, 707/638–639, 694–695, 705, 790–792, 707/821–826, 636, 703–704, 802; 713/185
See application file for complete search history.

(56) References Cited

U.S. PATENT DOCUMENTS

| | | | | |
|---|---|---|---|---|
| 5,060,144 A | * | 10/1991 | Sipple et al. | 710/200 |
| 5,117,352 A | | 5/1992 | Falek | 714/4.5 |

(Continued)

FOREIGN PATENT DOCUMENTS

| | | | |
|---|---|---|---|
| EP | 0278312 | * | 8/1988 |
| EP | 1473632 | | 11/2004 |

(Continued)

OTHER PUBLICATIONS

Performance analysis of three implementation strategies for distributed lock management, IEE Proc.-Comput. Digit. Tech., vol. 148, No. 4/5, Jul./Sep. 2001, pp. 176-187.*

(Continued)

*Primary Examiner* — Srirama Channavajjala
(74) *Attorney, Agent, or Firm* — Baker Botts L.L.P.

(57) ABSTRACT

A method and a distributed locking system for the management of lock resources in a distributed files system having several lock managers, each managing lock resources in its respective domain. Each lock manager maintains a registry lock file that comprises of a list of all locked files and a list of lock requests. The registry lock files of all lock managers in the distributed locking system are saved in a central database. Furthermore, the system enables concurrent locking operations of different file sharing protocols on the same file system resources.

16 Claims, 7 Drawing Sheets

(56) References Cited

U.S. PATENT DOCUMENTS

| | | | |
|---|---|---|---|
| 5,226,143 A | 7/1993 | Baird et al. | 711/145 |
| 5,339,427 A * | 8/1994 | Elko et al. | 718/103 |
| 5,454,108 A * | 9/1995 | Devarakonda et al. | 718/104 |
| 5,459,871 A | 10/1995 | Van Den Berg | 718/104 |
| 5,537,645 A * | 7/1996 | Henson et al. | 709/203 |
| 5,649,184 A * | 7/1997 | Hayashi et al. | 711/147 |
| 5,659,682 A * | 8/1997 | Devarakonda et al. | 714/47.1 |
| 5,742,813 A | 4/1998 | Kavanagh et al. | 1/1 |
| 5,813,016 A | 9/1998 | Sumimoto | 1/1 |
| 5,828,876 A | 10/1998 | Fish et al. | |
| 5,918,229 A | 6/1999 | Davis et al. | 705/27.1 |
| 5,966,706 A | 10/1999 | Biliris et al. | 1/1 |
| 6,009,427 A | 12/1999 | Wolff | |
| 6,105,085 A | 8/2000 | Farley | 710/41 |
| 6,148,414 A | 11/2000 | Brown et al. | 714/5.1 |
| 6,173,293 B1 | 1/2001 | Thekkath et al. | |
| 6,189,007 B1 * | 2/2001 | Boonie et al. | 707/611 |
| 6,332,197 B1 | 12/2001 | Jadav et al. | 714/6.1 |
| 6,389,420 B1 | 5/2002 | Vahalia et al. | 707/8 |
| 6,438,548 B1 | 8/2002 | Grim et al. | 1/1 |
| 6,523,078 B1 | 2/2003 | Desai | |
| 6,574,654 B1 | 6/2003 | Simmons et al. | 718/104 |
| 6,601,070 B2 | 7/2003 | Zhang et al. | |
| 6,618,744 B1 | 9/2003 | Simmons et al. | 718/104 |
| 6,651,123 B1 | 11/2003 | Hutchison et al. | |
| 6,708,195 B1 | 3/2004 | Borman et al. | 718/102 |
| 6,708,198 B1 * | 3/2004 | Simmons et al. | 718/104 |
| 6,965,893 B1 * | 11/2005 | Chan et al. | 1/1 |
| 7,150,019 B1 | 12/2006 | Simmons et al. | |
| 7,340,743 B1 | 3/2008 | Anural et al. | 718/104 |
| 8,086,581 B2 * | 12/2011 | Oshri et al. | 707/704 |
| 2002/0199045 A1 | 12/2002 | Browning et al. | 710/100 |
| 2004/0199734 A1 * | 10/2004 | Rajamani et al. | 711/163 |
| 2004/0220931 A1 * | 11/2004 | Guthridge et al. | 707/8 |
| 2005/0155011 A1 | 7/2005 | Heik et al. | 717/100 |
| 2005/0216463 A1 | 9/2005 | Klein et al. | 707/9 |
| 2005/0289143 A1 * | 12/2005 | Oshri et al. | 707/8 |
| 2006/0136637 A1 | 6/2006 | Goldick | 710/200 |
| 2007/0033359 A1 | 2/2007 | Mori et al. | 711/163 |
| 2007/0143477 A1 | 6/2007 | Kaminsky et al. | 709/225 |
| 2010/0242050 A1 * | 9/2010 | Chan | 718/108 |
| 2012/0059963 A1 * | 3/2012 | Pasupuleti et al. | 710/200 |
| 2012/0303628 A1 * | 11/2012 | Silvola | 707/741 |
| 2012/0310989 A1 * | 12/2012 | Weissman et al. | 707/793 |

FOREIGN PATENT DOCUMENTS

| | | | |
|---|---|---|---|
| WO | 99/38095 | | 7/1999 |
| WO | WO 2004025515 | * | 3/2004 |
| WO | 2006/065269 | | 2/2006 |
| WO | 2009/154842 | | 12/2009 |
| WO | WO 2010/136514 | * | 12/2010 |

OTHER PUBLICATIONS

K. Makkia et al., "Efficient detection and resolution of deadlocks in distributed databases", Computer Communications 22 (1999), pp. 637-643.

Ninnit Desai et al. "Scalable Distributed Concurrency Services for Hierarchical Locking", Proceedings of the 23rd International Conference on Distributed Computing Systems (ICDCS'03), IEEE 2003, 2003.

W.J. Knottenbelt et al., "Performance analysis of three implementation strategies for distributed lock management", IEE Proc.-Comput. Digit. Tech., vol. 148, No. 4/5, Jul./Sep. 2001.

Randal C. Burns, et al., "Semi-Preemptible Locks for a Distributed File System", 2000 IEEE, pp. 397-404, 2000.

* cited by examiner

METHOD FOR MANAGING LOCK RESOURCES IN A DISTRIBUTED STORAGE SYSTEM

CROSS-REFERENCE TO RELATED APPLICATIONS

This application is a continuation of U.S. patent application Ser. No. 12/333,868 filed on Dec. 12, 2008, now U.S. Pat. No. 8,086,581 Granted Dec. 27, 2011; which is a continuation of U.S. patent application Ser. No. 11/159,216 filed on Jun. 23, 2005 (Abandoned), which claims priority from U.S. Provisional Patent Application No. 60/581,721, filed Jun. 23, 2004, the contents of which are incorporated herein in its entirety by reference.

BACKGROUND OF THE INVENTION

The present invention relates generally to distributed file systems, and more particularly, for managing lock resources in distributed file systems.

During the past decade, the demand for scalability of storage systems has sharply increased. To meet this demand many storage systems implement distributed architectures, i.e., distributed storage systems. Generally, multiple processing nodes (e.g., storage servers) that serve data to client applications characterize a distributed storage system. The processing nodes and systems that host the client applications are connected through a network.

Referring to FIG. 1, an exemplary diagram of a distributed storage system 100 is shown. The system 100 comprises of a plurality of independent processing nodes 110 connected to storage devices 120 through a Fiber Channel (FC) connection 130. A storage device 120 may be a tape drive, a disk drive, a redundant array of independent disks (RAID) or similar devices. The processing nodes 110 are further connected to a plurality of clients 140 through a gigabit Ethernet or InfiBand connection 150. The clients 140 may utilize any file sharing protocols, such as network file system (NFS), common internet file system (CIFS), direct access file system (DAFS) or AppleShare to access data stored in storage devices 120. The processing nodes 110 communicate through a network 160, which may be a dedicated network, a wide area network (WAN), a metropolitan area network (MAN) or a local area network (LAN). This allows distributed storage system 100 to aggregate dispersed data centers into a single, unified, storage device. An example of a distributed storage system 100 is disclosed in PCT patent application PCT/US00/34258, entitled "Interconnect Topology for a scalable Distributed Computer System" assigned to common assignee and which is hereby incorporated by reference for all that it discloses.

The operation of the system 100 is managed by a distributed file system, which allows for sharing and storing files in the storage devices 120 or in a cache memory on various levels of storage hierarchy. Additionally, the distributed file system provides a locking mechanism to maintain data consistency of shared files. Specifically, the locking mechanism guarantees that only one client can write to a single file at a time. For example, when a client 140-1 writes to a file "A", the file is locked to prevent another client 140-2 from manipulating the file "A". When client 140-1 closes file "A" and client 140-2 attempts to write to that file, the distributed file system then informs client 140-2 that changes were made to the file "A".

As mentioned above, client 140 can access a file using a plurality of file sharing protocols, each such protocol providing a different mechanism for locking files. For example, the NFS protocol supports share locks and byte range locks, whereas the CIFS protocol supports share locks and byte range locks, as well as the opportunistic locks (Oplocks). A share lock provides exclusive or non-exclusive access permission for an entire file, while the byte range lock provides the same permission for a portion of a file. The Oplock is a non-persistent mechanism that is designed for optimizing local file caching. The Oplock allows a client 140 to notify a processing node 110 that another client (or process) requires access to the file and as result client 140 should flush the cached file back to the server. Generally, an exclusive lock granted to a client 140 does not allow other clients to access the file. A non-exclusive lock granted to a client 140 allows other clients to access the file for reading from or writing to the file. The access rights depend on the lock's mode.

In related art, distributed file mechanisms are disclosed in U.S. Pat. Nos. 5,828,876, 6,009,427 and 6,173,293. However, the disclosed mechanisms do not provide locking services satisfying the locking requirements of all file-sharing protocols. Specifically, the current locking mechanisms do not enable simultaneous operations of different sharing protocols on the same file system resource. Furthermore, the distributed locking mechanisms disclosed in the related are not scalable beyond a certain number of nodes.

Therefore, it would be advantageous to provide a method and a distributed locking system that would resolve the shortcomings introduced in by the prior art.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above.

A first aspect of the present invention provides a method for managing file locks in a distributed storage system by providing a plurality of registry lock files maintained by a plurality of locking managers, wherein each of the registry lock files comprises a list of locked files and a list of lock requests. Next, the method provides a plurality of lock resource objects, wherein each of the plurality of lock resource objects is allocated to a lockable file. Finally, the method services a client lock request based on the information maintained by the lock resource objects and the registry lock files. The registry lock file comprises a unique identification of the client requesting the lock and a host name of the client, and the list of files contains files locked by the client requesting the lock in a domain of the locking manager. The list of files also contains a file name of the locked file and a counter recording the number of requested locks for the locked file.

In the present invention, each of the lock resource objects is part of metadata of the lockable file. In addition, each of the lock resource objects comprises at least a block queue, a convert queue, a grant list and a wakeup list. The block queue comprises lock requests that are not granted. The convert queue comprises granted lock requests attempting to change lock modes. The grant list comprises lock requests granted by the lock resource object, and the wakeup list comprises blocked lock requests with limited time duration.

Servicing a client lock request comprises receiving a new lock request from the client to lock a file, forwarding the lock request to a lock manager that belongs to the same domain to which the file to be locked belongs to and writing the lock request to the registry lock file maintained by the lock manager. The lock request is blocked if the convert queue or the block queue comprises at least one lock request, and the lock request is blocked if it is in conflict with an already granted lock saved in the grant list. Otherwise, the lock request is granted. Blocking the lock request comprises inserting the lock request into the lock queue, inserting the lock request into the wakeup list if the lock request comprises a timeout parameter and sending a message that the lock request is blocked. The granting of a lock request comprises inserting the lock request into the grant queue and sending a message that the convert lock that request is granted.

In the alternative, servicing of the lock request comprises receiving a convert lock request to change the mode of the lock, searching in the registry lock file for a lock request associated with the convert lock request and blocking the convert lock request if at least the convert queue is not empty and/or the requested mode is not compatible with a most restrictive mode of a currently granted lock. Otherwise, the lock request is granted. Blocking the convert lock request further comprises changing the mode of the lock request associated with the convert lock request, inserting the lock request into the convert queue and sending a message that the convert lock request is blocked. Granting the convert lock request comprises changing the mode of the lock request associated with the convert lock request, inserting the lock request into the grant list and sending a message that the convert lock request is granted.

A second aspect of the present invention provides a computer program product for enabling a computer to manage file locks in a distributed storage system comprising software instructions for enabling the computer to perform predetermined operations, and a computer readable medium bearing the software instructions. The predetermined operations comprise providing a plurality of registry lock files maintained by a plurality of locking managers, wherein each of the registry lock files comprises a list of locked files and a list of lock requests. Next, the predetermined operations provide a plurality of lock resource objects, wherein each of the plurality of lock resource objects is allocated to a lockable file. Finally, the predetermined operations service a client lock request based on the information maintained by the lock resource objects and the registry lock files. The registry lock file comprises a unique identification of the client requesting the lock and a host name of the client, and the list of files contains files locked by the client requesting the lock in a domain of the locking manager. The list of files also contains a file name of the locked file and a counter recording the number of requested locks for the locked file.

In the present invention, each of the lock resource objects is part of metadata of the lockable file. In addition, each of the lock resource objects comprises at least a block queue, a convert queue, a grant list and a wakeup list. The block queue comprises lock requests that are not granted. The convert queue comprises granted lock requests attempting to change lock modes. The grant list comprises lock requests granted by the lock resource object, and the wakeup list comprises blocked lock requests with limited time duration.

The predetermined operations service a client lock request by receiving a new lock request from the client to lock a file, forwarding the lock request to a lock manager that belongs to the same domain to which the file to be locked belongs to and writing the lock request to the registry lock file maintained by the lock manager. The predetermined operations block the lock request if the convert queue or the block queue comprises at least one lock request, and the predetermined operations block the lock request if it is in conflict with an already granted lock saved in the grant list. Otherwise, the predetermined operations grant the lock request. The predetermined operations block a lock request by inserting the lock request into the lock queue, inserting the lock request into the wakeup list if the lock request comprises a timeout parameter and sending a message that the lock request is blocked. The predetermined operations grant a lock request by inserting the lock request into the grant queue and sending a message that the convert lock that request is granted.

In the alternative, the predetermined operations service a lock request by receiving a convert lock request to change the mode of the lock, searching in the registry lock file for a lock request associated with the convert lock request and blocking the convert lock request if at least the convert queue is not empty and/or the requested mode is not compatible with a most restrictive mode of a currently granted lock. Otherwise, the predetermined operations grant a lock request. The predetermined operations block the convert lock request by changing the mode of the lock request associated with the convert lock request, inserting the lock request into the convert queue and sending a message that the convert lock request is blocked. The predetermined operations grant the convert lock request by changing the mode of the lock request associated with the convert lock request, inserting the lock request into the grant list and sending a message that the convert lock request is granted.

A third aspect of the present invention provides a distributed lock system for managing lock resources in a distributed storage system. The distributed lock system comprises a plurality of locking managers, wherein each of the plurality of locking managers is capable of managing lock resources in its respective domain. The system further comprises a plurality of metadata servers capable of maintaining a plurality of lock resource objects, and a central database for maintaining locking information. Each of the plurality of lock resource objects is part of metadata of the lockable file. The locking information comprises a plurality of registry lock files, wherein each of the plurality registry lock files comprises at least a list of locked files and a list of lock requests. Each of the plurality of lock resource objects is allocated to a lockable file. The registry lock file comprises a unique identification of the client requesting the lock and a host name of the client. The list of files contains files locked by the client requesting the lock in a domain of the locking manager, and the list of files includes at least a file name of the locked file and a counter recording a number of requested locks for the locked file.

Each of the plurality of lock resource objects comprises a block queue, a convert queue, a grant list and a wakeup list. The block queue comprises lock requests that are not granted. The convert queue comprises granted lock requests attempting to change lock modes. The grant list comprises lock requests granted by the lock resource object. The wakeup list comprises blocked lock requests with limited time duration.

Additional aspects and/or advantages of the invention will be set forth in part in the description that follows and, in part, will be apparent from the description, or may be learned by practice of the invention.

BRIEF DESCRIPTION OF THE DRAWINGS

The accompanying drawings, which are incorporated in and constitute a part of this specification illustrate exemplary embodiments of the invention and, together with the description, serve to explain the aspects, advantages and principles of the invention. In the drawings.

DETAILED DESCRIPTION OF THE ILLUSTRATIVE, NON-LIMITING EMBODIMENTS OF THE INVENTION

The present invention will now be described more fully with reference to the accompanying drawings, in which exemplary, non-limiting embodiments of the invention are shown.

Figure 1:
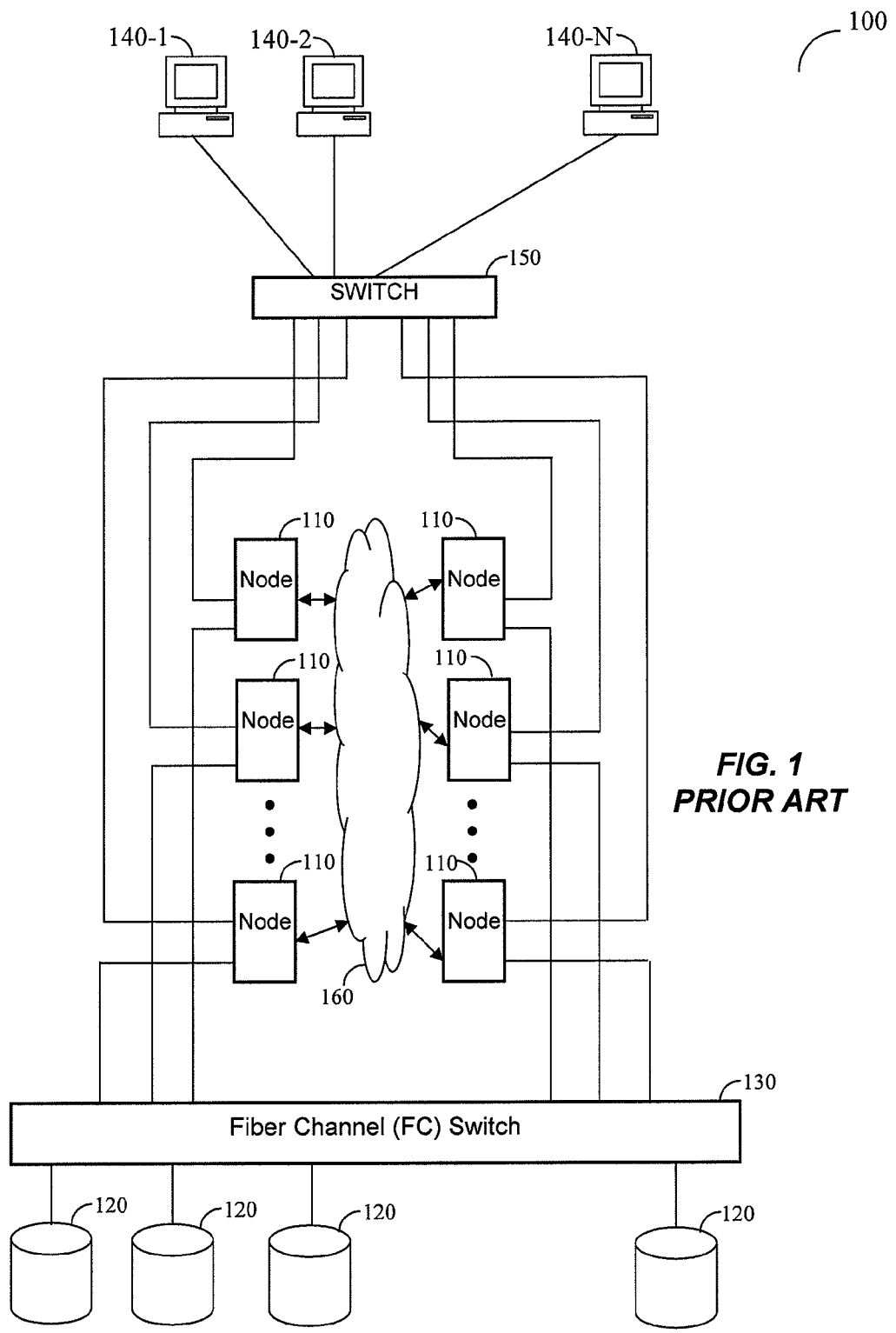
FIG. 1 is an exemplary diagram of a conventional distributed storage system.
Figure 2:
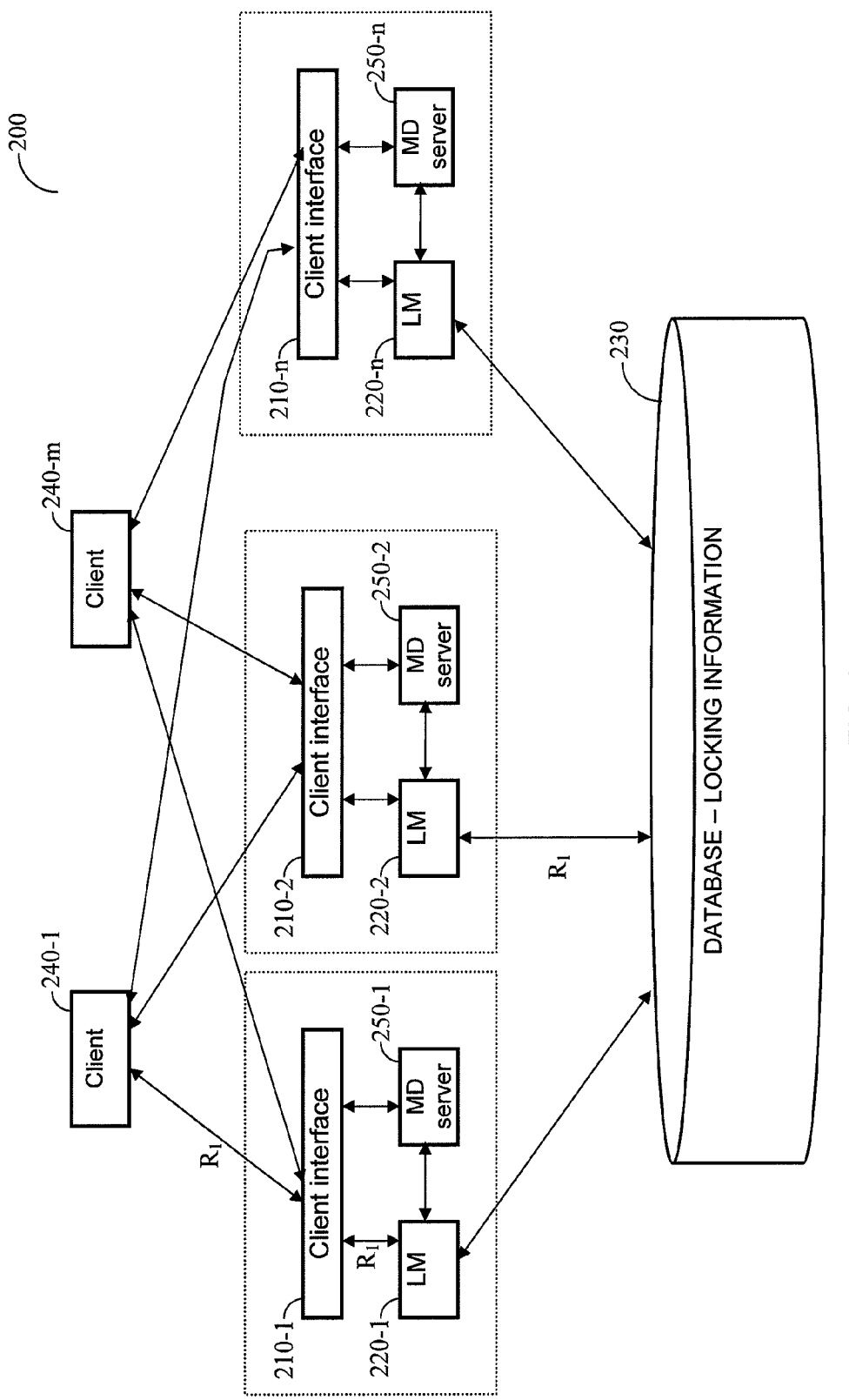
FIG. 2 is a diagram of a distributed locking system according to an exemplary embodiment of the present invention.

Referring to FIG. 2, an exemplary and non-limiting diagram of a distributed locking system (DLS) 200 in accordance with the present invention is shown. The DLS 200 comprises a plurality of locking managers (LMs) 220-1, 220-2, 220-n connecting to a central database 230 that maintains the locking information. Each of the LMs 220-1, 220-2, 220-n is further connected to a client interface 210-1, 210-2, 210-n and a metadata (MD) server 250-1, 250-2, 250-n. The client interface 210-1, 210-2, 210-n is responsible for receiving requests from a client 240-1, 240-m and handling the interface with a LM 220-1, 220-2, 220-n (among other components of a distributed file system that are not depicted in FIG. 2). In essence, the client interface 210-1, 210-2, 210-n acts as a protocol converter, translating between client-side protocols (e.g., NFS, CIFS, AppleTalk, etc.) and internal file system requests, such as remote procedure call (RPC) requests. The MD server 250-1, 250-2, 250-n maintains the metadata information or objects of a file, relative to files are located. The metadata information in MD server 250-1, 250-2, 250-n may include, but is not limited to, file name, its type, its permissions, ownership and other type of information other than the content of the file. The MD server 250-1, 250-2, 250-n further maintains as part of the metadata information a lock resource (LR) object assigned for each locked file. The structure and the functionality of the LR objects will be described in greater detail below. The client interface 210-1, 210-2, 210-n, the LM 220-1, 220-2, 220-n and the MD server 250-1, 250-2, 250-n may coexist on a single processing node (e.g., node 110). The content of the database 230 is distributed over the processing nodes.

Figure 3:
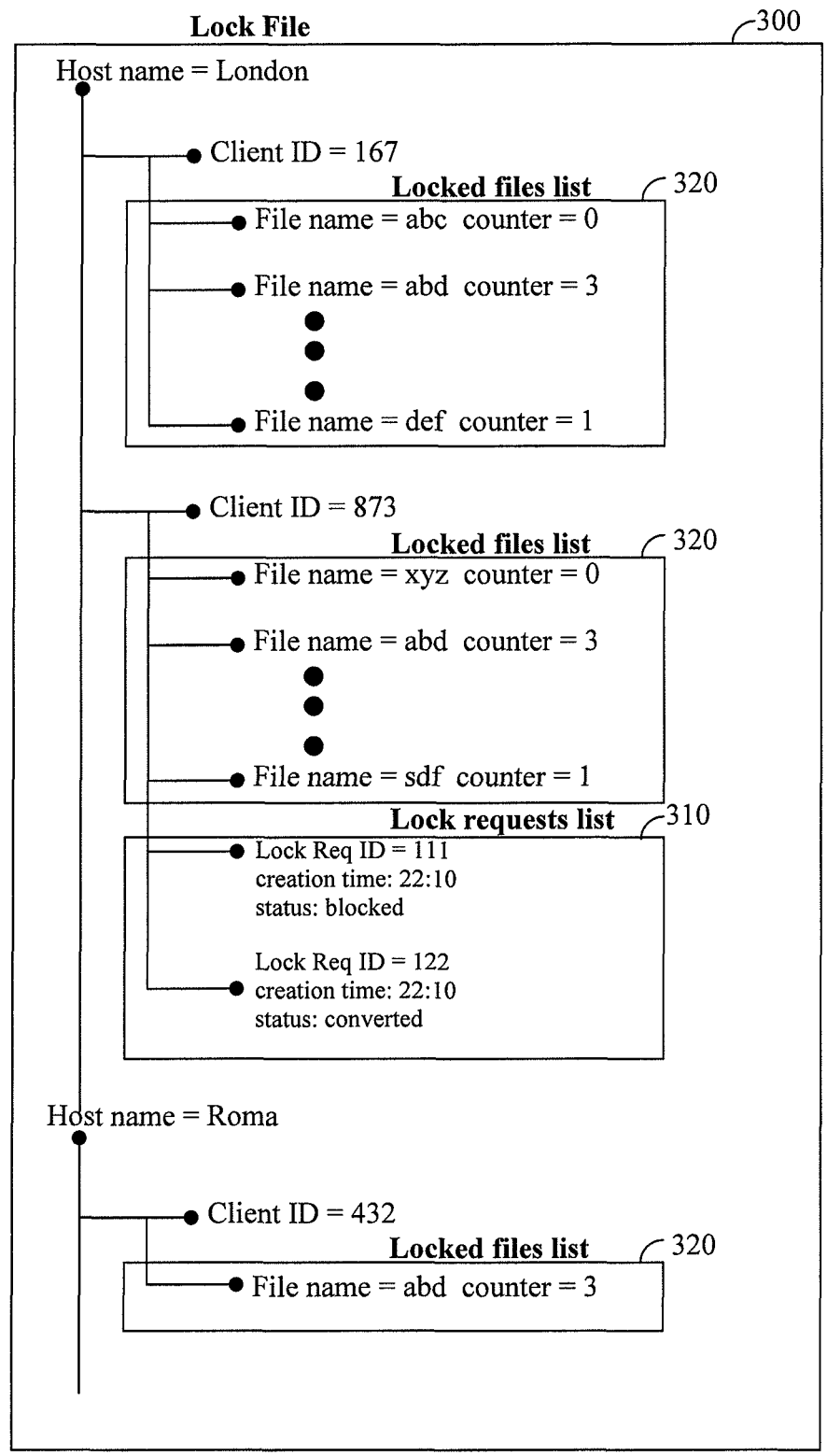
FIG. 3 is an illustration of a registry lock file according to an exemplary embodiment of the present invention.

Each LM 220-1, 220-2, 220-n manages the lock requests of files belonging to its domain (i.e., address space) using a plurality of LR objects and the plurality of registry lock files of the plurality of LMs 220-1, 220-2, 220-n are kept in the database 230. A registry lock file comprises a list of locked files in the domain of a LM 220-1, 220-2, 220-n. Specifically, as shown in FIG. 3, a lock file 300 comprises the unique identification (ID) of the client requesting the lock, the client's host name and a list of files 320 locked by the requesting client (hereinafter the "locked file list"). Each entry in the locked file list 320 comprises the file name of the locked file and a counter counting the number of requested locks for that file. The counter is incremented each time a new lock is added and decremented each time a lock is removed. The registry lock file 300 further comprises a list of lock requests 310 per each client (hereinafter the "lock request list"). The lock request list 310 comprises the client unique ID, the client's host name, a request unique ID, the request creation time and the status of the request, i.e., blocked, converted, or granted.

In an exemplary embodiment of the present invention, the registry lock file 300 may be implemented using a balanced tree indexes (e.g., B-tree indexes). In this exemplary embodiment, each record in the registry lock file 300 comprises the host name and the requesting client's unique identification (ID) represented in the following notation host index@domian.client index and the name of an index file containing the locked file list 320 of the client under the domain designated in host index@domian.client index.

Figure 4:
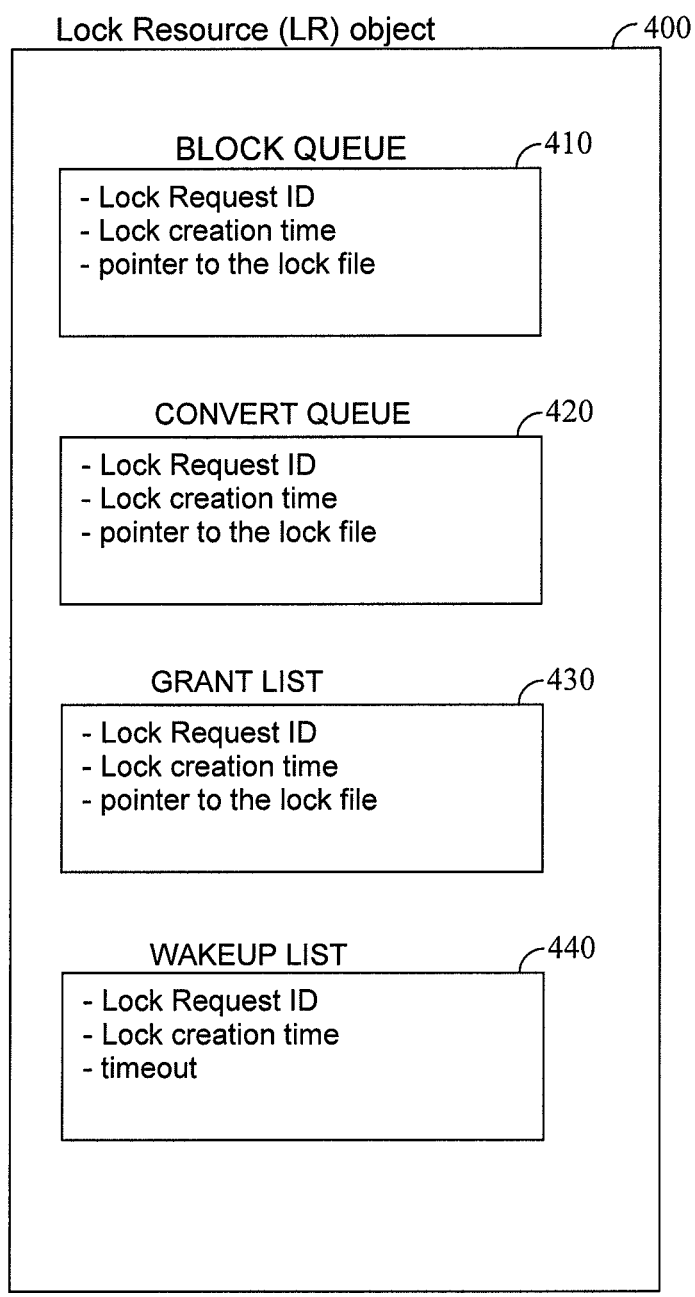
FIG. 4 is an illustration of a lock resource object according to an exemplary embodiment of the present invention.

A LR object is allocated per a lockable entity once a client 240-1, 240-m requests to lock this entity. A lockable entity may be a file, a portion of a file or any object stored in the physical storage of a distributed storage system. The LM 220-1, 220-2, 220-n manages the lock requests using a plurality of LR objects. An exemplary LR object 400 is shown in FIG. 4. The LR object 400 maintains a block queue 410, a convert queue 420, a grant list 430 and a wakeup list 440. The block queue 410 contains new requests that are not granted, as these requests are in conflict with a currently granted lock saved in grant list 430. The convert queue 420 contains granted requests that attempt to upgrade or downgrade their lock modes, which are incompatible with the mode of the currently granted lock. The grant list 430 contains all locks granted by the LM 220-1, 220-2, 220-n on the LR object 400. Each request in the block queue 410, the convert queue 420 and the grant list 430 comprises a lock request unique ID, its request creation time and a pointer to the corresponding lock request list 310 in the registry lock file 300. The wakeup list 440 maintains blocked lock requests that include a timeout parameter. The timeout parameter defines the duration of the request, i.e., the maximum time that a request waits on a blocked lock.

As discussed above, the status of each incoming lock request can be set to be one of blocked, converted or granted. A blocked request is a request that cannot be granted due to a conflict with an already granted lock or locks. A blocked request is inserted to the block queue 410 of the LR object 400. The request is removed from the block queue 410 only if the following conditions are satisfied: a) the request's mode is compatible with the most restrictive mode of locks kept in the grant list 430; b) the convert queue 420 is empty; and c) the request lock is at the head of the block queue 410. A converted request is a dissatisfied request of the client 240-1, 240-m to change the lock's current mode. The client 240-1, 240-m can request to upgrade the lock's mode, i.e., to change the mode from a non-exclusive to exclusive mode or to downgrade the lock's mode, i.e., to change the mode from an exclusive to non-exclusive mode. A converted request is saved in the convert queue 420. The LM 220-1, 220-2, 220-n grants all demote requests in-place, namely the lock is downgraded to its new mode without being inserted to the convert queue 420. A granted request is a request that was granted. The LM 220-1, 220-2, 220-n grants a lock request if there are currently no locks on the files requested to be locked, i.e., the grant list 430 is empty or if the convert queue 420 is empty and the lock request's mode is compatible with the most restrictive mode of the currently granted lock. All granted locks on the LR 400 are saved in the grant list 430. The methods for handling a new lock request and a convert request are described in greater detail below.

The following is an example describing the operation of the DLS 200. A client 240-1 sends a lock request R1 to the LM 220-1 to lock a file "B". The lock's mode of request R1 is exclusive, i.e., deny other clients access to file 'B". File "B" is kept in the domain of the LM 220-2. A lock request comprises the client unique ID, the client's host name, and the client process ID. The LM 220-1, upon receiving request R1, replaces the client unique ID and client's host name with a host index and a client index using the following notation host index@domain.client index. In addition, the LM 220-1 checks if a LR object assigned to file 'B" belongs to its domain; since it does not, the LM 220-1 forwards the request R1 to the LM 220-2. The LM 220-2 saves the request R1 in its registry lock file in the database 230 and detects a LR object in the MD server 250-2 assigned to file "B". If such a LR object does not exist, the LM 220-1 allocates a new LR object. It should be noted that while modifying the registry lock file, the database 230 is locked. This is performed in order to ensure data consistency. Subsequently, the LM 220-2 checks if the request R1 can be granted. If the request is granted, the file is locked and the lock request is saved in the grant list 430 and its status is updated to a granted state. As the lock of file "B" holds exclusive rights, all subsequent lock requests on file 13" with non-exclusive lock's mode will be denied. To allow other clients access to file "B", the client 240-1 must send a convert request to change the lock's mode on file "B" from exclusive to non-exclusive or a request to remove the lock. In another respect, if the request R1 is denied, the LM 220-2 replies to the client 240-1 with a message notifying that the lock request is denied and then the lock request in saved in the block queue 410.

In case of a failover or shutdown of at least one processing node, all locks managed by a LM of the failed node are released and the LR objects are deleted. For that purpose, the LM 220-1, 220-2, 220-n traverses its registry lock file to detect the locked files that are to be unlocked. If a client 240-1, 240-m fails, all the locks requested by this client are unlocked.

Figure 5:
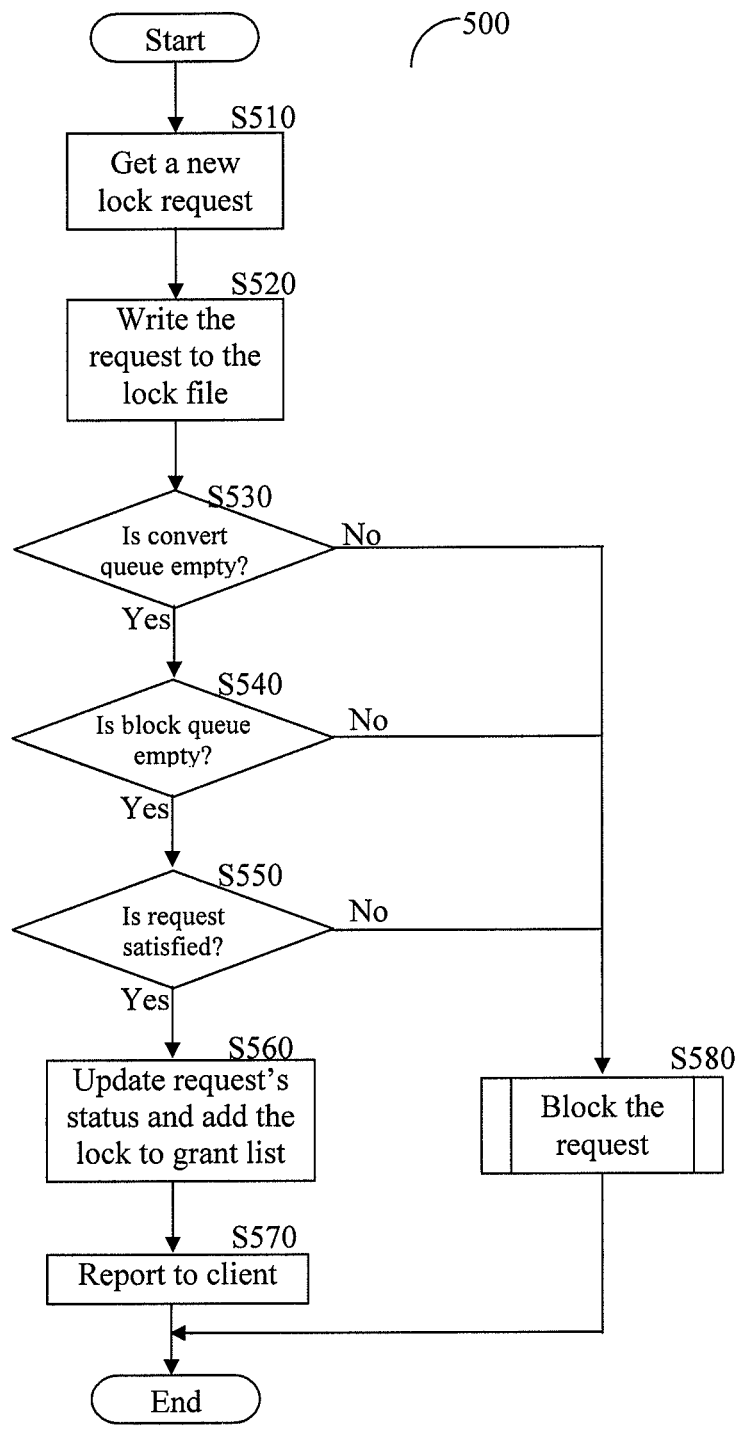
FIG. 5 is a flowchart describing the method for handling a new lock request according to an exemplary embodiment of the present invention.

Referring to FIG. 5, a non-limiting flowchart 500 describing the method for handling a new lock request, in accordance with an exemplary embodiment of this invention, is shown. The method is executed by a LM (e.g., LM 220-1) belonging to the same domain as that of the file requested to be locked. The type of the lock request may be handled by, but is not limited to, a share lock, a byte range lock, an Oplock and other lock schemes. At S510, a new lock request received at a LM acquires a unique ID. At S520, the database 230 is locked for preventing other clients to write to the database 230 and the new request's parameters are saved in the in the registry lock file (e.g., registry lock file 300) corresponds to the LM that received the request. The request parameters comprise a client unique ID (or a client index), a host name (or a host index), a request unique ID, and the request creation time. Once the writing to the registry lock files is completed, the database 230 is unlocked. At S530, a check is made to determine if the convert queue is empty, and if so, execution continues with S540; otherwise, the execution continues at S580 where the request is blocked. At S540, a check is performed to determine if the block queue is empty and if so the execution continues with 5550; otherwise, the execution continues with S580. At S550 another check is made to determine if the request can be satisfied. Specifically, it is checked whether the lock request is in conflict with an already granted lock saved in the grant list. If the request can be satisfied, at 5560, the lock's status in the registry lock file is updated to a granted state and the request is added to the grant list. At 5570, a message is send to the client notifying the lock request is granted. If the lock request is denied, the execution continues with S580.

Figure 6:
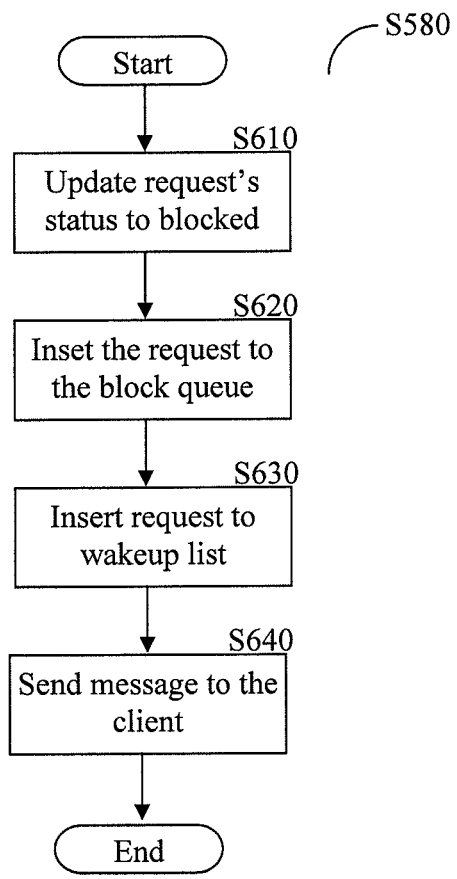
FIG. 6 is a flowchart describing the step for blocking a lock request according to an exemplary embodiment of the present invention.

Referring to FIG. 6, a detailed flowchart describing the blocking of a request (S580) is shown. At S610, the request status in the registry lock file is set to a blocked mode. At 5620, the request is added to the block queue. At S630, the request and its wakeup time are saved in the wakeup list. S630 is performed only if the request comprises a timeout parameter, which defines the duration time of the request. The duration time defines the amount of time that a lock request waits to a lock to be unlocked. At S640, a message is sent to the requesting client notifying that the lock request is blocked.

Figure 7:
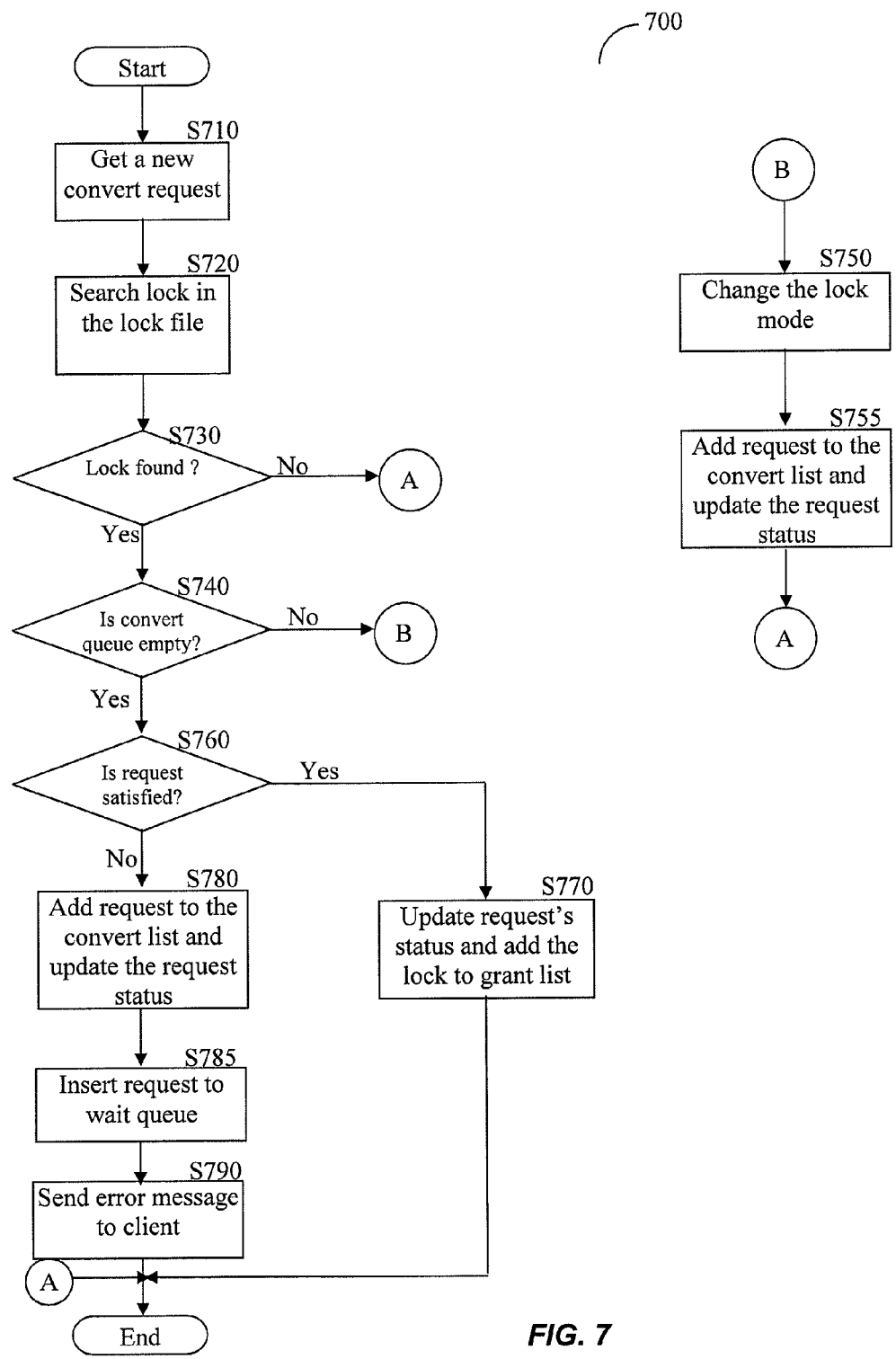
FIG. 7 is a flowchart describing the method for handling a convert lock request according to an exemplary embodiment of the present invention.

Referring to FIG. 7, a non-limiting flowchart 700 describing the method for handling a convert request, in accordance with an exemplary embodiment of this invention, is shown. The method is executed by a LM (e.g., LM 220-1) belonging to the same domain as that of the file being locked. The type of the lock request to be handled may be, but is not limited to, a share lock, a byte range lock, an Oplock and other lock schemes. A client can request to upgrade the lock's mode, i.e., to change lock's mode from a non-exclusive to exclusive mode or to downgrade the lock's mode, i.e., to change the mode from an exclusive to non-exclusive mode. At S710, a new convert request is received at a LM. The convert request comprises the client unique ID (or client index), client's host name (or host index) and the lock ID of the lock to be converted. At S720, the lock request list (e.g., list 310) in the registry lock file (e.g., registry lock file 300) of the LM receiving the request is being searched in order to identify an entry associated with the lock requested to be converted. The search is made using the lock's unique ID. At S730, a check is made to determine if a lock having the same lock ID as designated in the request is found, and if so the execution continues with S740; otherwise, the request is denied and execution ends. It should be noted that a request for converting the mode of a non-granted lock is also denied. At S740, a check is made to determine if the convert queue 420 is empty, and if so execution continues at S760; otherwise, execution continues with S750 where the lock's mode is changed to the new requested mode. At 5755, the status of the lock is set to converted state and the lock is added to the convert queue 420. At S760, a check is made to determine if the convert lock request can be satisfied. Specifically, it is checked whether the requested mode is compatible with the most restrictive mode of the currently granted lock. If the request is satisfied, then at S770, the lock's status is set to a granted state and the lock is added to the grant list. If the request is denied, then at 5780 the lock status is set to a converted state and the lock is added to the convert queue 420. At S785, the request and its wakeup time are saved in the wakeup list 440. 5785 is performed only if the request comprises a timeout parameter. At S790, a message is sent to the requesting client notifying the request is denied.

In an exemplary embodiment of the present invention, the method and the DLS disclosed herein can be operated in a mixed mode, namely to handle concurrently lock requests utilized through different file sharing protocols. Each protocol defines its own requirements to impose a lock on a file. These different requirements of the lock mode should be addressed by the DLS 200 while operating is a mixed mode. For example, the CIFS protocol requires that file byte range locks be granted only after a share lock is granted on the file, while in the NFS protocol only byte range locks can be used.

As all NFS requests are byte range lock requests, in a mixed mode of operation a share lock entry for each client is created. Specifically, a first byte range lock request from a client creates a share lock request. If the share lock is compatible with currently granted locks this request will be satisfied. After granting a share lock on the file, the requested byte range is locked. The restrictive mode of the byte range lock is the mode of the share lock on the locked file.

In an exemplary embodiment of the present invention, the DLS and the methods for handling the lock requests disclosed herein can be operated in conjunction with a distributed shared files system (DSFS) disclosed in U.S. patent application Ser. No. 10/265,778, entitled "Flexible and Adaptive Read and Write Storage System Architecture" assigned to common assignee and which is hereby incorporated by reference for all that it contains.

The foregoing description of the exemplary embodiments of the invention has been presented for purposes of illustration and description. It is not intended to be exhaustive or to limit the invention to the precise form disclosed, and modifications and variations are possible in light of the above teachings or may be acquired from practice of the invention. The exemplary embodiments were chosen and described in order to explain the principles of the invention and its practical application to enable one skilled in the art to utilize the invention in various embodiments and with various modifications as are suited to the particular use contemplated.

Thus, while only exemplary embodiments of the invention have been specifically described herein, it will be apparent that numerous modifications may be made thereto without departing from the spirit and scope of the invention. Further, acronyms are used merely to enhance the readability of the specification and claims. It should be noted that these acronyms are not intended to lessen the generality of the terms used and they should not be construed to restrict the scope of the claims to the exemplary embodiments described therein.

What is claimed is:

1. A computer implemented method of managing file locks within a distributed storage system using a lock manager having a plurality of locking mechanisms, the method comprising:
   receiving, by a client interface of a server, a plurality of lock requests from a plurality of clients;
   maintaining, at the server, metadata associated with the lock requests in a registry lock file;
   maintaining a lock resource object at the server for each locked file, each lock resource object including a block queue, a convert queue, a wakeup list, and a granted lock request list;
   responding, by a lock manager of the server, to a lock request received from a client of the plurality of clients by:
      determining if the lock request is a convert lock request, wherein a convert lock request is a request to change the mode of a lock;
      searching the plurality of registry lock files for a lock request associated with the convert lock request; and
      blocking the lock request if at least one of the convert queue is not empty, the block queue is not empty, or the lock request is not compatible with a mode of a currently granted lock request;
      otherwise, granting the lock request by updating a lock status in an associated registry lock file to a granted status, adding the lock request to the granted lock request list, and generating a message to the client notifying the client that the lock request was granted.

2. The method of claim 1, wherein the registry lock file further includes a unique identification of the client requesting the lock request and a host name of the client.

3. The method of claim 2, wherein the granted lock request list includes files locked by the client requesting the lock request.

4. The method of claim 3, wherein the granted lock request list includes a file name of each locked file and a corresponding counter for recording a number of requested locks for said each locked file.

5. The method of claim 1, wherein the granted lock request list includes lock requests granted by the plurality of lock resource objects.

6. The method of claim 1, wherein the wakeup list maintains blocked lock requests that include a timeout parameter.

7. The method of claim 1, wherein blocking the lock request further comprises:
   inserting the lock request into the block queue;
   inserting the lock request into the wakeup list if the lock request includes a timeout parameter; and
   sending a message to the client that the lock request is blocked.

8. The method of claim 1, wherein blocking the lock request further comprises:
   changing the mode of the lock request associated with the convert lock request;
   inserting the lock request into the convert queue; and
   sending a message that the convert lock request is blocked.

9. The method of claim 1, wherein granting the lock request further comprises:
   changing the mode of the lock request associated with the convert lock request;
   inserting the lock request into the granted lock request list; and
   sending a message that the convert lock request is granted.

10. A distributed system for managing file locks within a distributed storage system having a plurality of locking mechanisms, the system comprising:
    a plurality of computers, wherein each computer includes logic embodied in a non-transitory computer readable medium, the logic including a locking system including:
       a lock manager configured to manage file locks;
       a server communicatively coupled to the lock manager and configured to maintain a plurality of lock resource objects, each lock resource object including a block queue, a convert queue, a wakeup list, and a granted lock request list; and
       a client interface configured to enable the lock manager and the server to interface with a plurality of clients;
       wherein the lock manager is configured to respond to a lock request received from a client by:
          determining if the lock request is a convert lock request, wherein a convert lock request is a request to change the mode of a lock;
          searching the plurality of registry lock files for a lock request associated with the convert lock request; and
          blocking the lock request if at least one of the convert queue is not empty, the block queue is not empty, or the lock request is not compatible with a mode of a currently granted lock request;
          otherwise, granting the lock request by updating a lock status in an associated registry lock file to a granted status, adding the lock request to the granted lock request list, and generating a message to the client notifying the client that the lock request was granted;
    a central database coupled to the lock manager of each of the locking systems configured to maintain locking information.

11. The distributed system for managing file locks of claim 10, wherein the locking information includes a plurality of registry lock files, each of the registry lock files including a list of locked files and a list of lock requests.

12. The distributed system for managing file locks of claim 10, wherein each of the plurality of lock resource objects is allocated to a lockable file.

13. The distributed system for managing file locks of claim 10, wherein the wakeup list maintains blocked lock requests that include a timeout parameter.

14. A computer program product comprising computer executable instructions stored on a non-transitory tangible computer readable medium, for managing file locks within a distributed storage system, the product comprising:
   an interface configured to receive a plurality of lock requests from a plurality of clients;
   an interface to a server, the server configured to maintain at least:
      metadata associated with the lock requests in a registry lock file; and
      a lock resource object for each locked file, each lock resource object containing a block queue, a convert queue, a wakeup list, and a granted lock request list;
   an interface to a database containing locking information; and
   a lock manager configured respond to a lock request received from a client by:
      determining if the lock request is a convert lock request, wherein a convert lock request is a request to change the mode of a lock;
      searching the plurality of registry lock files for a lock request associated with the convert lock request; and
      blocking the lock request if at least one of the convert queue is not empty, the block queue is not empty, or the lock request is not compatible with a mode of a currently granted lock request;
      otherwise, granting the lock request by updating a lock status in an associated registry lock file to a granted status, adding the lock request to the granted lock request list, and generating a message to the client notifying the client that the lock request was granted.

15. The computer program product of claim 14, wherein the wakeup list maintains blocked lock requests that include a timeout parameter.

16. The computer program product of claim 14, wherein blocking the lock request further comprises the lock manager inserting the lock request into the block queue, inserting the lock request into the wakeup list if the lock request comprises a timeout parameter, and sending a message to the client that the lock request is blocked.

* * * * *